United States Patent
Kodama et al.

(10) Patent No.: US 12,109,868 B2
(45) Date of Patent: Oct. 8, 2024

(54) RADIATION INFORMATION CALCULATING DEVICE AND TEMPERATURE INFORMATION CALCULATING DEVICE

(71) Applicant: DENSO CORPORATION, Kariya (JP)

(72) Inventors: Masayuki Kodama, Kariya (JP); Hiroshi Takeda, Kariya (JP)

(73) Assignee: DENSO CORPORATION, Kariya (JP)

( * ) Notice: Subject to any disclaimer, the term of this patent is extended or adjusted under 35 U.S.C. 154(b) by 574 days.

(21) Appl. No.: 17/343,387

(22) Filed: Jun. 9, 2021

(65) Prior Publication Data
US 2021/0291615 A1    Sep. 23, 2021

Related U.S. Application Data

(63) Continuation of application No. PCT/JP2019/048736, filed on Dec. 12, 2019.

(30) Foreign Application Priority Data

Jan. 23, 2019  (JP) ................. 2019-009438

(51) Int. Cl.
*B60H 1/00*  (2006.01)
*G01J 5/00*  (2022.01)
(Continued)

(52) U.S. Cl.
CPC ....... *B60H 1/00742* (2013.01); *B60H 1/0073* (2019.05); *B60H 1/0075* (2013.01);
(Continued)

(58) Field of Classification Search
CPC . B60H 1/00742; B60H 1/0073; G01J 5/0025; G01J 5/0859; G01V 10/764; G01V 20/59
See application file for complete search history.

(56) References Cited

U.S. PATENT DOCUMENTS 4,920,759 A    5/1990  Tanaka et al.
5,145,112 A *  9/1992  Ueda ................. F24F 11/00
                                                         165/243
(Continued)

FOREIGN PATENT DOCUMENTS

EP    2030817 B1    6/2011
JP    H09286220 A   11/1997
(Continued)

OTHER PUBLICATIONS

Takuya et.al., "Influence of Emission and Insolation on Passengers in Automobile Passenger Compartments" 2010.

*Primary Examiner* — Jianying C Atkisson
*Assistant Examiner* — For K Ling
(74) *Attorney, Agent, or Firm* — Harness, Dickey & Pierce, P.L.C.

(57) ABSTRACT

In order to detect the amount of radiation received by or the temperature of air in the vicinity of each of body parts of an occupant in a vehicle, a radiation information calculating device includes: an acquisition unit that acquires member temperature information that reflects temperatures of members exposed to a cabin of a vehicle; a calculation unit configured to calculate plural radiation information corresponding to each of body parts of an occupant in the cabin based on the member temperature information acquired by the acquisition unit; and an output unit that outputs the plural radiation information calculated by the calculation unit. The radiation information represents an amount of radiation received by a corresponding body part of the occupant.

4 Claims, 13 Drawing Sheets

(51) Int. Cl.
  *G01J 5/08* (2022.01)
  *G01J 5/48* (2022.01)
  *G06V 10/764* (2022.01)
  *G06V 20/59* (2022.01)

(52) U.S. Cl.
  CPC ........... *G01J 5/0025* (2013.01); *G01J 5/0859* (2013.01); *G06V 10/764* (2022.01); *G06V 20/59* (2022.01); *B60H 2001/00178* (2013.01); *G01J 5/48* (2013.01)

(56) References Cited

U.S. PATENT DOCUMENTS

| | | | | |
|---|---|---|---|---|
| 5,291,748 | A * | 3/1994 | Ueda | B60H 1/00742 236/78 D |
| 6,550,686 | B2 * | 4/2003 | Kawai | B60H 1/00792 374/E1.005 |
| 6,659,358 | B2 * | 12/2003 | Kamiya | B60H 1/00792 165/204 |
| 7,084,774 | B2 * | 8/2006 | Martinez | F24F 11/30 236/44 C |
| 7,389,812 | B2 * | 6/2008 | Kumada | B60H 1/00742 165/203 |
| 2003/0211820 | A1 * | 11/2003 | Tsuji | B60H 1/00785 454/93 |
| 2016/0082808 | A1 * | 3/2016 | Perkins | B60H 1/00871 165/203 |
| 2016/0341603 | A1 | 11/2016 | Kusukame et al. | |
| 2018/0244129 | A1 * | 8/2018 | Whitens | G01J 5/0037 |
| 2019/0195521 | A1 | 6/2019 | Kusukame et al. | |
| 2020/0224904 | A1 | 7/2020 | Kusukame et al. | |

FOREIGN PATENT DOCUMENTS

| | | | |
|---|---|---|---|
| JP | 10230728 | A * | 9/1998 |
| JP | H10230728 | A | 9/1998 |
| JP | 2005-007923 | A | 1/2005 |
| JP | 2016217886 | A | 12/2016 |
| JP | 2017030377 | A | 2/2017 |

\* cited by examiner

RADIATION INFORMATION CALCULATING
DEVICE AND TEMPERATURE
INFORMATION CALCULATING DEVICE

CROSS REFERENCE TO RELATED APPLICATIONS

The present application is a continuation application of International Patent Application No. PCT/JP2019/048736 filed on Dec. 12, 2019, which designated the U.S. and claims the benefit of priority from Japanese Patent Application No. 2019-9438 filed on Jan. 23, 2019. The entire disclosures of all of the above applications are incorporated herein by reference.

TECHNICAL FIELD

The present disclosure relates to a radiation information calculating device and a temperature information calculating device.

BACKGROUND

The amount of radiation received by an occupant in a vehicle is calculated using a reflective portion formed on a surface of a seat belt. A detection unit detects infrared rays reflected by the reflective portion, and a calculation unit calculates the radiation temperature in the cabin based on the detected infrared rays.

SUMMARY

According to one aspect of the present disclosure, a radiation information calculating device includes: an acquisition unit configured to acquire member temperature information that reflects temperatures of a plurality of members exposed to a cabin of a vehicle; a calculation unit configured to calculate a plurality of radiation information representing an amount of radiation received by a corresponding body part of an occupant in the cabin, corresponding to each of body parts of the occupant, based on the member temperature information acquired by the acquisition unit; and an output unit configured to output the plurality of radiation information calculated by the calculation unit.

BRIEF DESCRIPTION OF THE DRAWINGS

FIG. 7 is a diagram showing a position of the sun and values of pixels of thermography in one example.

FIG. 9 is a diagram showing a position of the sun and values of pixels of thermography in one example.

DESCRIPTION OF EMBODIMENT

Figure 1:
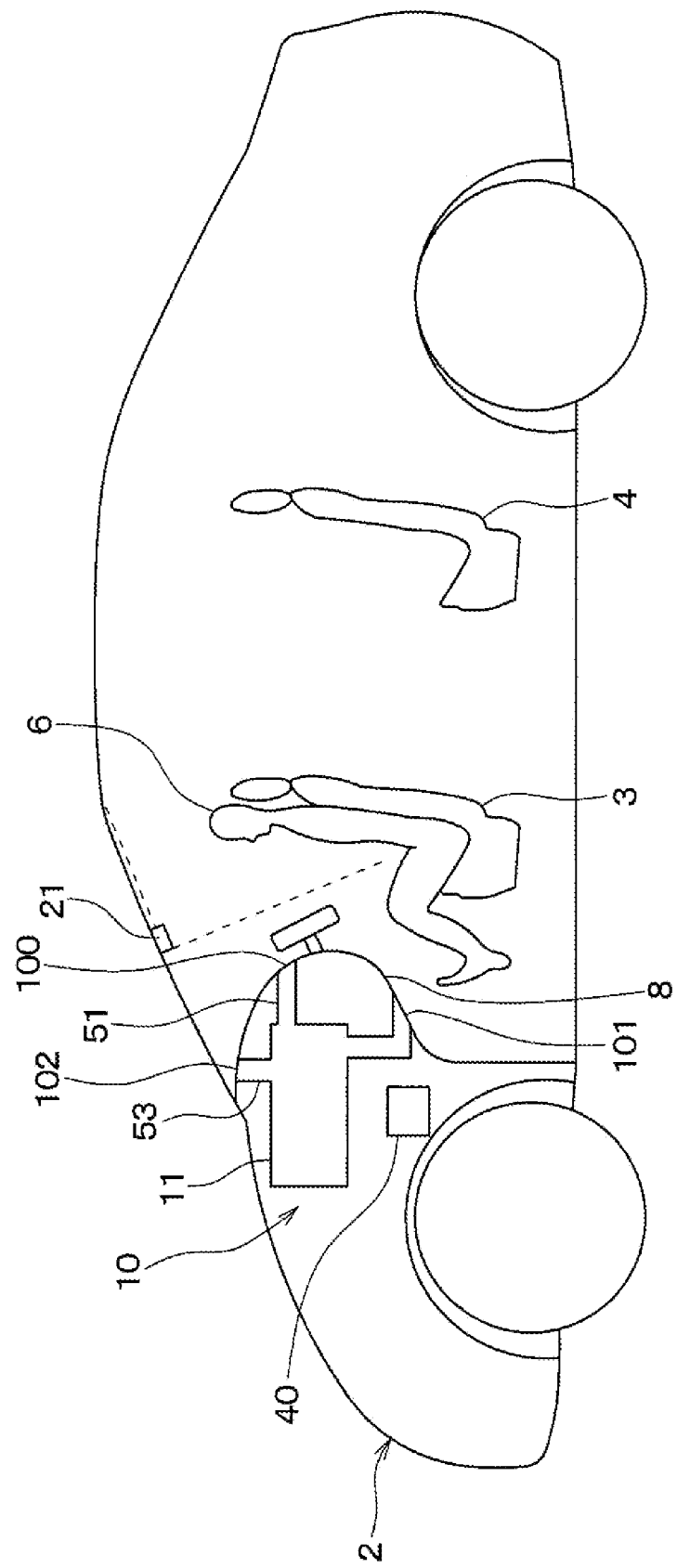
FIG. 1 is a schematic view of a vehicle equipped with an air conditioner.

To begin with, examples of relevant techniques will be described.

The amount of radiation received by an occupant in a vehicle is calculated, specifically using a reflective portion formed on a surface of a seat belt. A detection unit detects infrared rays reflected by the reflective portion, and a calculation unit calculates the radiation temperature in the cabin based on the detected infrared rays.

According to study by the inventors, it is not possible to grasp, in detail, the feeling of the occupant relative to heat, since the radiation temperature is calculated only at a certain part of the reflecting portion as a representative point. The thermal environment inside the vehicle is extremely uneven. Specifically, the amount of radiation received and the temperature of air in the vicinity are different depending on the body parts of the occupant. For example, there are multiple members such as ceiling, windshield, and side glass with different temperatures at different positions in the cabin. The body parts of the occupant are differently affected by the multiple members.

The present disclosure provides a device to detect the amount of radiation received or the temperature of air in the vicinity for each of the body parts of an occupant in a vehicle.

According to one aspect of the present disclosure, a radiation information calculating device includes: an acquisition unit configured to acquire member temperature information that reflects temperatures of a plurality of members exposed to a cabin of a vehicle; a calculation unit configured to calculate a plurality of radiation information representing an amount of radiation received by a corresponding body part of an occupant in the cabin, corresponding to each of body parts of the occupant, based on the member temperature information acquired by the acquisition unit; and an output unit configured to output the plurality of radiation information calculated by the calculation unit.

In this way, the plural radiation information is calculated corresponding to each of the body parts of the occupant in the cabin. As mentioned above, the body parts of the occupant may receive significantly different amounts of radiation. According to the inventors' examination, there are two reasons. One is that there are plural members exposed at different positions in the cabin and having different temperatures. The other is that the body parts receive radiation differently from the plural members.

The plural radiation information is calculated based on the member temperature information that reflects the temperatures of the members exposed in the cabin of the vehicle. Therefore, it is possible to calculate the plural radiation information based on the appropriate information to meet such circumstances peculiar to the cabin.

According to another aspect of the present disclosure, a temperature information calculating device includes: an acquisition unit configured to acquire member temperature information that reflects temperatures of a plurality of members exposed to a cabin of a vehicle; a calculation unit configured to calculate a plurality of air temperature information representing a temperature of air in a vicinity of a corresponding body part of an occupant in the cabin, corresponding to each of body parts of the occupant, based on the member temperature information acquired by the acquisition unit; and an output unit configured to output the plurality of air temperature information calculated by the calculation unit.

In this way, the air temperature information is calculated corresponding to each of the body parts of the occupant in the cabin. As mentioned above, the temperatures of air in the vicinity of the body parts of the occupant may significantly different from each other. According to the inventors' examination, there are two reasons. One is that there are plural members exposed at different positions in the cabin and having different temperatures. The other is that the body parts are thermally affected by the multiple members differently.

The air temperature information is calculated based on the member temperature information that reflects the temperatures of the members exposed in the cabin of the vehicle. Therefore, it is possible to calculate the air temperature information based on the appropriate information according to the circumstances peculiar to the cabin.

The reference numerals attached to the components indicate an example of correspondence between the components and the like and specific components and the like in embodiments to be described below.

Figure 2:
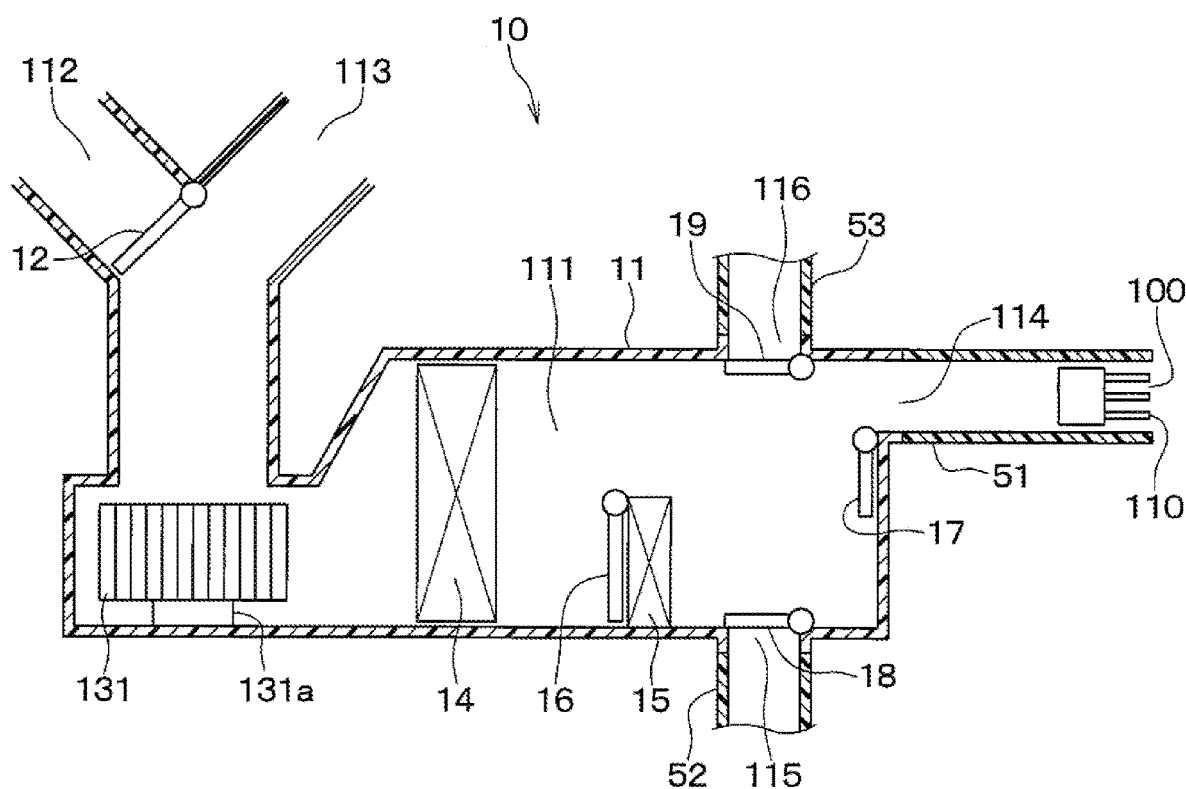
FIG. 2 is a configuration diagram of an air conditioner case and peripheral devices.
Figure 3:
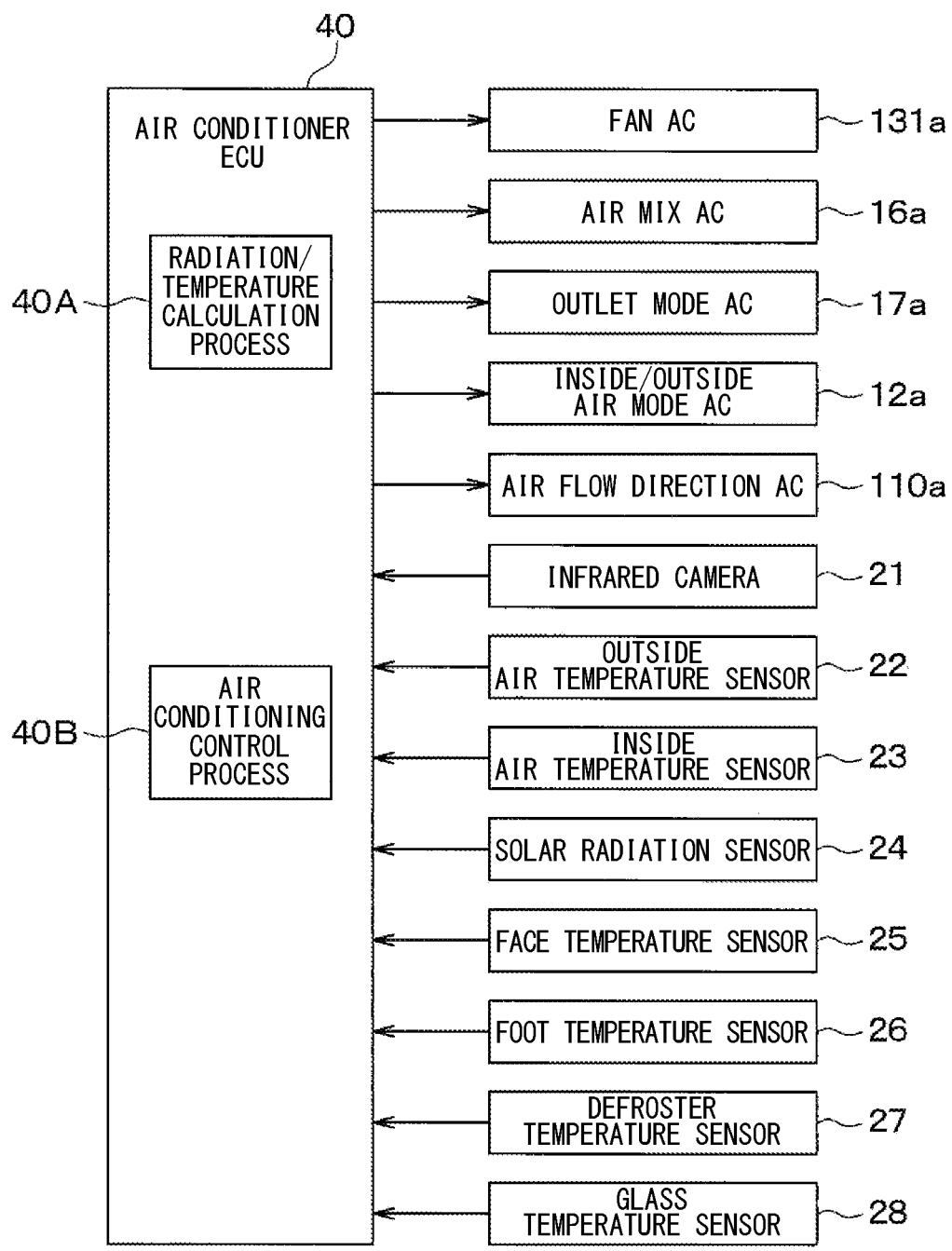
FIG. 3 is a block diagram showing an electrical configuration of the air conditioner.

An embodiment will be described. As shown in FIGS. 1, 2 and 3, an air conditioner 10 for a vehicle according to this embodiment is mounted on a vehicle 2. In the cabin of the vehicle 2, a front seat 3 in which an occupant 6 who is a driver is seated and a rear seat 4 in which an occupant other than the driver is seated are provided. The air conditioner 10 adjusts the temperature of air in the cabin of the vehicle 2.

The air conditioner 10 includes an air conditioner ECU 40, an air conditioner case 11, an inside/outside air switching door 12, a centrifugal fan 131, an evaporator 14, a heater core 15, an air mix door 16, a face door 17, a foot door 18, a face duct 51, and a foot duct 52. Further, the air conditioner 10 includes a defroster duct 53, an air flow direction adjusting plate 110, an infrared camera 21, an outside air temperature sensor 22, an inside temperature sensor 23, a solar radiation sensor 24, a face temperature sensor 25, a foot temperature sensor 26, a defroster temperature sensor 27, and a windshield temperature sensor 28. Further, the air conditioner 10 includes a fan actuator 131a, an air mix actuator 16a, an outlet mode actuator 17a, an inside/outside air mode actuator 12a, and an air flow direction actuator 110a.

The air conditioner case 11 is provided in the instrument panel 8 and surrounds a ventilation passage 111 through which temperature-controlled air passes to be blown into the cabin.

The inside/outside air switching door 12 adjusts the opening area of the inside air introduction port 112 and the opening area of the outside air introduction port 113. The inside/outside air switching door 12 rotates so as to close one of the inside air introduction port 112 and the outside air introduction port 113, and the other is opened when the one is closed. Thereby, the inside/outside air switching door 12 can adjust the ratio of the volume of the inside air introduced into the ventilation passage 111 to the volume of the outside air introduced into the ventilation passage 111 (that is, the ratio of the inside air to the outside air). The inside air is air inside the cabin, and the outside air is air outside the cabin. The inside/outside air mode actuator 12a drives the inside/outside air switching door 12, and is controlled by the air conditioner ECU 40 as shown in FIG. 3.

The centrifugal fan 131 rotates to introduce the inside air, if the inside air introduction port 112 is open, and the outside air, if the outside air introduction port 113 is open, into the ventilation passage 111. The introduced air is sent to the downstream side of the centrifugal fan 131 in the air flow in the ventilation passage 111. The fan actuator 131a drives the centrifugal fan 131, and is controlled by the air conditioner ECU 40 as shown in FIG. 3.

The evaporator 14 is arranged in the ventilation passage 111, downstream of the centrifugal fan 131 in the air flow. The evaporator 14 cools the air sent from the centrifugal fan 131. The evaporator 14 constitutes a well-known refrigeration cycle together with a compressor, a condenser, an expansion valve and the like (not shown). This refrigeration cycle is also a component of the air conditioner 10. When the refrigerant flowing through the refrigeration cycle passes through the evaporator 14, the refrigerant and air exchange heat, such that the refrigerant evaporate to cool the air.

The heater core 15 is arranged in the ventilation passage 111, downstream of the evaporator 14 in the air flow. The heater core 15 heats the air that has passed through the evaporator 14. Engine cooling water flows through the heater core 15, and the air is heated by heat exchange between the engine cooling water and the air.

The air mix door 16 is provided between the evaporator 14 and the heater core 15. The air mix door 16 adjusts the ratio of the air volume that bypasses the heater core 15 after passing through the evaporator 14 to the air volume that passes through the heater core 15 after passing through the evaporator 14, that is, the air mix ratio. The air mix actuator 16a drives the air mix door 16, and is controlled by the air conditioner ECU 40 as shown in FIG. 3.

As shown in FIG. 3, the air conditioner case 11 has a face opening 114, a foot opening 115, and a defroster opening 116 at the downstream side of the ventilation passage 111 in the air flow for blowing air from the ventilation passage 111 into the cabin. Air flows to the face opening 114, the foot opening 115, and the defroster opening 116 from an air mix space in which the air bypassing the heater core 15 and the air passing through the heater core 15 are mixed in the ventilation passage 111.

A mode switching door is provided for the face opening 114, the foot opening 115, and the defroster opening 116 for opening and closing the respective openings. The mode switching door is composed of a face door 17, a foot door 18, and a defroster door 19. The face door 17 opens and closes the face opening 114. The foot door 18 opens and closes the foot opening 115. The defroster door 19 opens and closes the defroster opening 116.

The outlet mode actuator 17a drives the face door 17, the foot door 18, and the defroster door 19, and is controlled by the air conditioner ECU 40 as shown in FIG. 3. The outlet mode is controlled by the air mix actuator 16a. The outlet mode includes, for example, a face mode, a foot mode, a defroster mode, and a bi-level mode. At the face mode, the face door 17 is opened and the foot door 18 and the defroster door 19 are closed. At the foot mode, the foot door 18 is opened and the face door 17 and the defroster door 19 are closed. At the defroster mode, the defroster door 19 is opened and the face door 17 and the foot door 18 are closed. At the bi-level mode, the face door 17 and the foot door 18 are opened and the defroster door 19 is closed.

One end of the face duct 51 is connected to the face opening 114, and the other end of the face duct 51 is opened at a position facing the seat back of the front seat 3 in the instrument panel 8. The air that has passed through the face opening 114 from the ventilation passage 111 flows into the face duct 51, passes through the face duct 51, and then is blown out into the cabin from the face outlet 100. The air blown out from the face outlet 100 flows toward or around the upper body of the occupant 6 seated in the front seat 3.

One end of the foot duct 52 is connected to the foot opening 115, and the other end of the foot duct 52, that is the foot outlet 101, is opened at a position facing the foot space in front of the seat cushion of the front seat 3, in the instrument panel 8. The air that has passed through the foot opening 115 from the ventilation passage 111 flows into the foot duct 52, passes through the foot duct 52, and then is blown out into the cabin from the foot outlet 101. The air blown out from the foot outlet 101 flows toward or around the feet of the occupant 6 seated in the front seat 3.

One end of the defroster duct 53 is connected to the defroster opening 116, and the other end of the defroster duct 53 is opened in the instrument panel 8 facing the windshield. The air that has passed through the defroster opening 116 from the ventilation passage 111 flows into the defroster duct 53, passes through the defroster duct 53, and then is blown out into the cabin from the defroster outlet 102. The air blown from the defroster outlet 102 flows toward the windshield or its surroundings.

As described above, the face outlet 100, the foot outlet 101, and the defroster outlet 102 are opened at different positions in the cabin. Among the body parts of the occupant 6 seated in the front seat 3, the body part belonging to the upper body is most strongly affected by the air blown out from the face outlet 100. Further, among the body parts of the occupant 6 seated in the front seat 3, the body part belonging to the lower body is most strongly affected by the air blown out from the foot outlet 101.

As shown in FIG. 2, the air flow direction adjusting plate 110 is attached to the face outlet 100. The air flow direction adjusting plate 110 adjusts the flow direction of air blown into the cabin from the face outlet 100. Specifically, by changing the orientation of the air flow direction adjusting plate 110, the flow direction of air blown from the face outlet 100 is changed in the vehicle width direction and the vehicle vertical direction. The air flow direction actuator 110a drives the air flow direction adjusting plate 110, and is controlled by the air conditioner ECU 40 as shown in FIG. 3.

Figure 4:
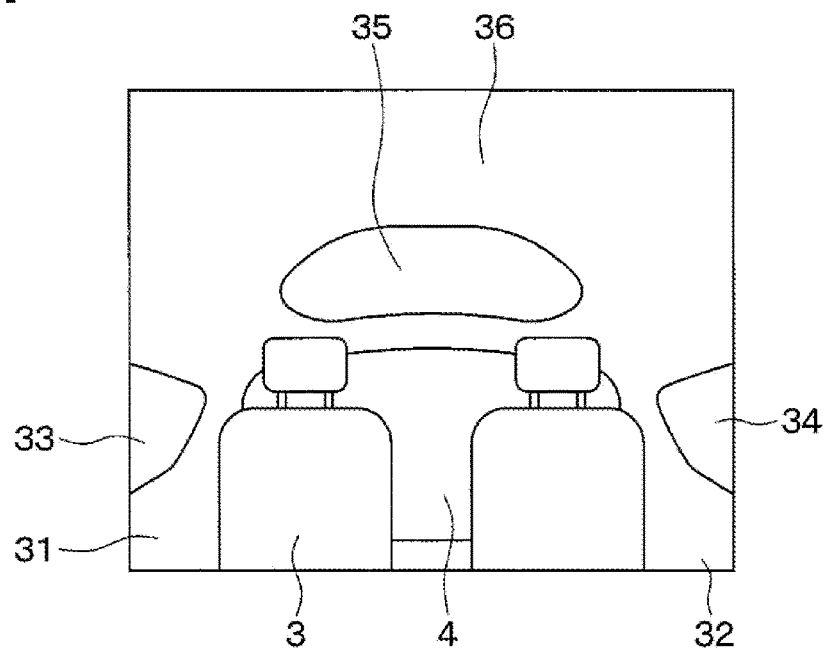
FIG. 4 is a diagram showing members included within an imaging range of an infrared camera.

The infrared camera 21 is a sensor that acquires infrared rays radiated from a predetermined imaging range, and generates and outputs an image representing the surface temperature of each position in the imaging range as a pixel value based on the acquired infrared rays. As shown in FIG. 4, the image includes the front seat 3, the rear seat 4, the passenger seat, the driver side door trim 31, the passenger side door trim 32, the driver side glass 33, the passenger side glass 34, the rear glass 35, and the ceiling 36 in the cabin, within the shooting range of the thermography.

The infrared camera 21 is positioned, for example, as shown in FIG. 1, around the upper end portion of the windshield in the cabin to realize such a shooting range, in the approximately central portion in the left-right direction of the vehicle. When a bird-eye view of the rear side is taken from this position, the image as shown in FIG. 4 is taken in the thermography. When a rear-view mirror is installed in this position, the infrared camera 21 may be attached to the rear-view mirror.

The front seat 3, the rear seat 4, the passenger seat, the driver side door trim 31, the passenger side door trim 32, the driver side glass 33, the passenger side glass 34, the rear glass 35, and the ceiling 36 are exposed to the cabin, and radiate heat according to the temperature, to greatly affect the amount of radiation to the occupant and the temperature of air in the vicinity of the occupant. Moreover, the temperatures of the members exposed to the cabin vary greatly non-uniformly depending on the traveling conditions and the environment of the vehicle. Therefore, there are members exposed at different positions in the cabin and having different temperatures. The body parts of an occupant are thermally affected by the radiation of the members differently. Therefore, as will be described later, radiation information and air temperature information of the body parts are calculated based on member temperature information and the like reflecting the temperatures of the members. The radiation information of the body parts represents the amount of radiation received by the corresponding body parts. The air temperature information of the body parts represents the temperature of air in the vicinity of the corresponding body parts.

The outside air temperature sensor 22 outputs a detection signal according to the temperature of air (that is, outside air) outside the cabin. The inside air temperature sensor 23 outputs a detection signal according to the temperature of air (that is, inside air) in the cabin. The solar radiation sensor 24 outputs a detection signal according to the amount of solar radiation into the cabin.

The face temperature sensor 25 located at the face outlet 100 detects the temperature of air blown from the face outlet 100 through the face duct 51. The foot temperature sensor 26 located at the foot outlet 101 detects the temperature of air blown from the foot outlet 101 through the foot duct 52. The defroster temperature sensor 27 located at the defroster outlet 102 detects the temperature of air blown from the defroster outlet 102 through the defroster duct 53. The windshield temperature sensor 28 detects the temperature of the windshield of the vehicle 2.

The air conditioner ECU 40 realizes various processes described later by executing a program stored in the ROM or the flash memory by a CPU having CPU, RAM, ROM, flash memory, and the like. In these processes, the RAM is used as a work memory. The air conditioner ECU 40 corresponds not only to the radiation information calculating device but also to the temperature information calculating device. The flash memory is a writable non-volatile storage medium. The RAM, ROM, and flash memory are all non-transitional tangible storage media.

Hereinafter, the operation of the air conditioner 10 configured as described above will be described. As shown in FIG. 3, the air conditioner ECU 40 executes a radiation/temperature calculation process 40A and an air conditioning control process 40B in parallel at the same time.

The air conditioner ECU 40 executes the radiation/temperature calculation process 40A to calculate radiation information of the body parts of the occupant 6 and air temperature information of the body parts of the occupant 6.

Figure 5:
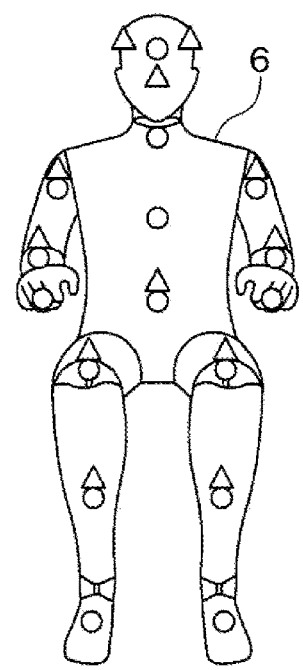
FIG. 5 is a diagram showing body parts that receive radiation, the amount of radiation and the temperature of air in the vicinity being calculated for each of the body parts.

The body parts for which radiation information is calculated are, as shown by the triangles in FIG. 5, right head, left head, face, right shoulder, left shoulder, right elbow, left elbow, abdomen, right knee, left knee, right shin, and left shin of the occupant 6. The number of the body parts for which radiation information is calculated is 12. The number of the body parts for which air temperature information is calculated is 16. As shown by the circles in FIG. 5, the body parts for which air temperature information is calculated are face, neck, right shoulder, left shoulder, chest, right elbow, left elbow, right hand, left hand, abdomen, right knee, left knee, right shin, left shin, right foot, left foot of the occupant 6. The details of the radiation/temperature calculation process 40A will be described later.

The air conditioner ECU 40 adjusts the temperature of air blown from the air conditioner case 11 into the cabin by executing the air conditioning control process 40B. Specifically, in the air conditioning control process 40B, the air conditioner ECU 40 repeats (for example, periodically in a 1-second cycle) calculations of the target blowout temperature TAO according to the following formula based on the set temperature Tset, the outside air temperature Tam, the inside air temperature Tr, and the amount of solar radiation Ts.

$$TAO=Kset \times Tset-Kr \times Tr-Kam \times Tam-Ks \times Ts+C$$

The set temperature Tset is set by a person in the vehicle by operating a temperature setting switch (not shown). The outside air temperature Tam, the inside air temperature Tr, and the amount of solar radiation Ts are determined based on the detection signals of the outside air temperature sensor 22, the inside air temperature sensor 23, and the solar radiation sensor 24, respectively. Kset, Kr, Kam, and Ks are control gains, and C is a constant for correction.

The air conditioner ECU 40 determines the amount of air blown by the centrifugal fan 131, the air mix ratio, the outlet mode, and the ratio of inside/outside air, using a well-known method, according to the calculated target outlet temperature TAO, each time when the target outlet temperature TAO is calculated.

The air conditioner ECU 40 determines the air flow direction at the face outlet 100 each time when the target outlet temperature TAO is calculated. Specifically, the air flow direction may be determined based on the radiation information of the body parts and the air temperature information of the body parts calculated by the radiation/temperature calculation process 40A. For example, the air conditioner ECU 40 may specify one of the body parts that receives the largest amount of radiation among the body parts, and determine a predetermined direction corresponding to the specified one as the air flow direction. Alternatively, the air conditioner ECU 40 may determine the air flow direction according to the operation contents by the occupant with respect to the operation panel (not shown).

Then, the air conditioner ECU 40 realizes the determined air flow amount, air mix ratio, outlet mode, inside/outside air ratio, and air flow direction by operating the fan actuator 131a, the air mix actuator 16a, the outlet mode actuator 17a, the inside/outside air mode actuator 12a, and the air flow direction actuator 110a.

The details of the radiation/temperature calculation process 40A will be described. The air conditioner ECU 40 repeatedly executes the flowchart shown in FIG. 6 in order to realize the radiation/temperature calculation process 40A.

Figure 6:
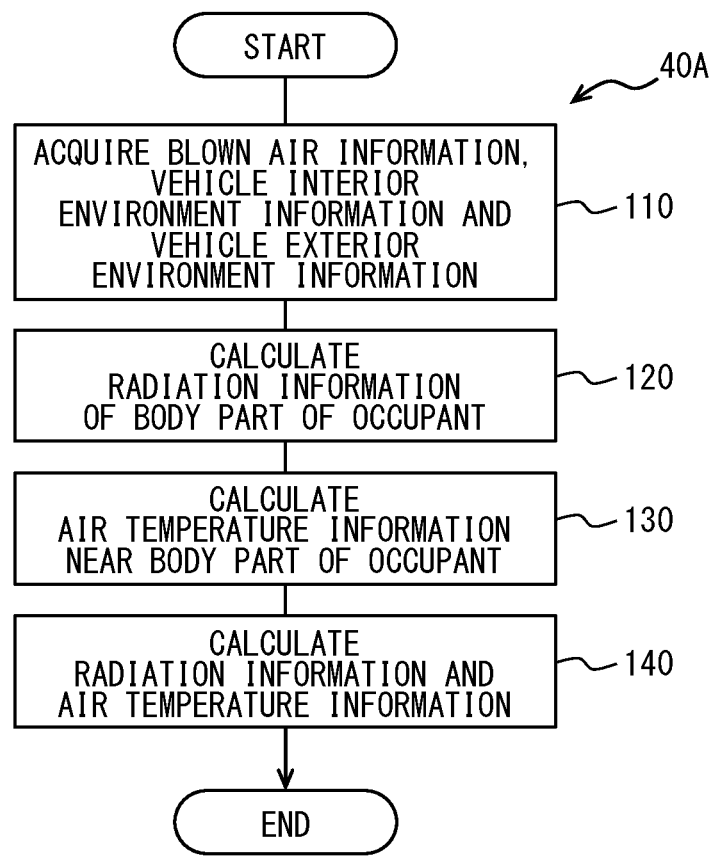
FIG. 6 is a flowchart illustrating radiation/temperature calculation processing.

In the process of FIG. 6, the air conditioner ECU 40 first acquires the blown air information, the vehicle interior environment information, and the vehicle exterior environment information in step 110.

The blown air information is information about the air blown into the cabin from the face outlet 100, the foot outlet 101, and the defroster outlet 102. Specifically, the blown air information includes the blown air temperature, the blown air volume, the outlet mode, the air flow direction, and the like.

The blown air temperature is the latest temperature detected by the face temperature sensor 25, the foot temperature sensor 26, and the defroster temperature sensor 27. When air is blown into the cabin from the air conditioner case 11, the air is blown into the cabin through at least one of the face outlet 100, the foot outlet 101, and the defroster outlet 102. Therefore, at least one of the face temperature sensor 25, the foot temperature sensor 26, and the defroster temperature sensor 27 detects the temperature of the air blown from the air conditioner case 11 into the cabin.

The blown air volume is the latest value of the blown air volume of the centrifugal fan 131 determined by the air conditioning control process 40B. The outlet mode is the latest value of the outlet mode determined by the air conditioning control process 40B. The air flow direction is the latest value of the air flow direction determined by the air conditioning control process 40B.

The vehicle interior environment information is information indicating the temperature environment in the cabin. Specifically, the vehicle interior environment information includes the inside air temperature, the windshield temperature, the ceiling temperature, and the like. The inside air temperature is the latest temperature detected by the inside air temperature sensor 23. The windshield temperature is the latest temperature detected by the windshield temperature sensor 28.

The side glass temperature is the temperature of the driver side glass 33 and the temperature of the passenger side glass 34. The rear glass temperature is the temperature of the rear glass 35. The door trim temperature is the temperature of the driver side door trim 31 and the temperature of the passenger side door trim 32. The ceiling temperature is the temperature of the ceiling 36 in the cabin.

The temperatures of the side glass, the rear glass, the door trim, and the ceiling are included in the thermography acquired by the infrared camera 21, since, as shown in FIG. 4, the shooting range of the infrared camera 21 includes the driver side door trim 31, the passenger side door trim 32, the driver side glass 33, the passenger side glass 34, the rear glass 35, and the ceiling 36. Moreover, within the thermography, each of the driver side door trim 31, the passenger side door trim 32, the driver side glass 33, the passenger side glass 34, the rear glass 35, and the ceiling 36 occupies plural pixels (that is, a pixel group). Therefore, the thermography includes information on the temperature distributions of the driver side door trim 31, the passenger side door trim 32, the driver side glass 33, the passenger side glass 34, the rear glass 35, and the ceiling 36.

In step 110, the air conditioner ECU 40 can acquire the temperatures of the side glass, the rear glass, the door trim, and the ceiling by acquiring the latest thermography from the infrared camera 21.

Of the vehicle interior environment information, the windshield temperature, the side glass temperature, the rear glass temperature, the door trim temperature, and the ceiling temperature are member temperature information that reflects the temperatures of the members 31 to 36 exposed in the cabin. The thermography includes member temperature information that reflects the temperatures of the members 31 to 36 exposed in the cabin.

The vehicle exterior environment information is information indicating the temperature environment outside the cabin. Specifically, the vehicle exterior environment information includes the outside air temperature, the amount of solar radiation, the direction of solar radiation, and the like. The outside air temperature is the latest temperature detected by the outside air temperature sensor 22. The amount of solar radiation is the latest amount of solar radiation detected by the solar radiation sensor 24.

The solar radiation direction is information indicating the direction of solar radiation with respect to the vehicle 2. This solar radiation direction is included in the thermography acquired by the infrared camera 21, since, as shown in FIG. 4, the cabin is included in the photographing range of the thermography. When the direction of sunlight changes, the distribution of the amount of light irradiation in the cabin changes. As a result, the temperature distribution in the cabin also changes. In particular, each temperature of the passenger side door trim 32, the driver side glass 33, and the rear glass 35 varies greatly depending on the direction of sunlight.

Figure 7:
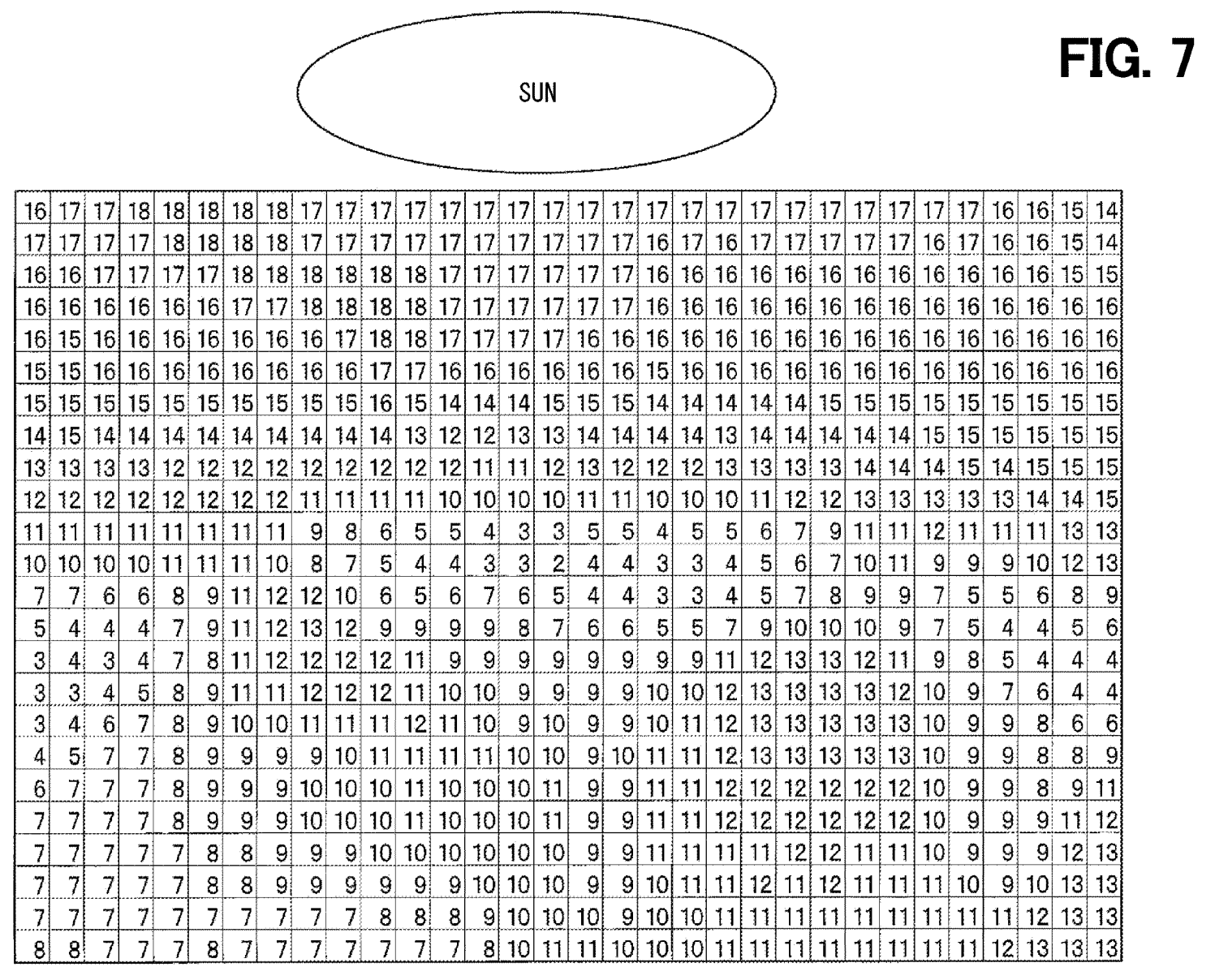
Figure 8:
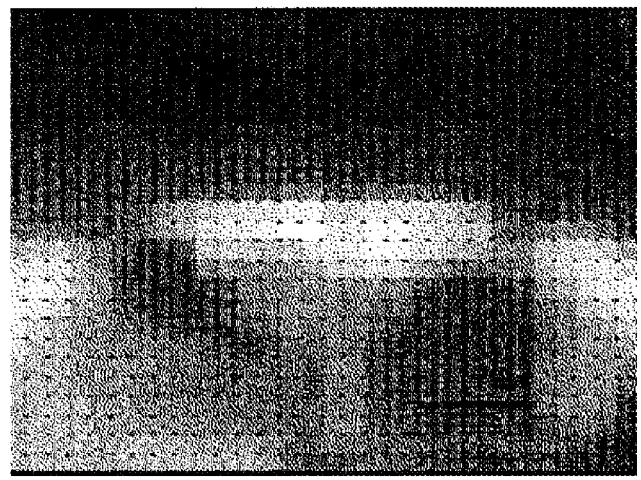
FIG. 8 is a diagram showing the values of pixel of thermography in terms of density.
Figure 9:
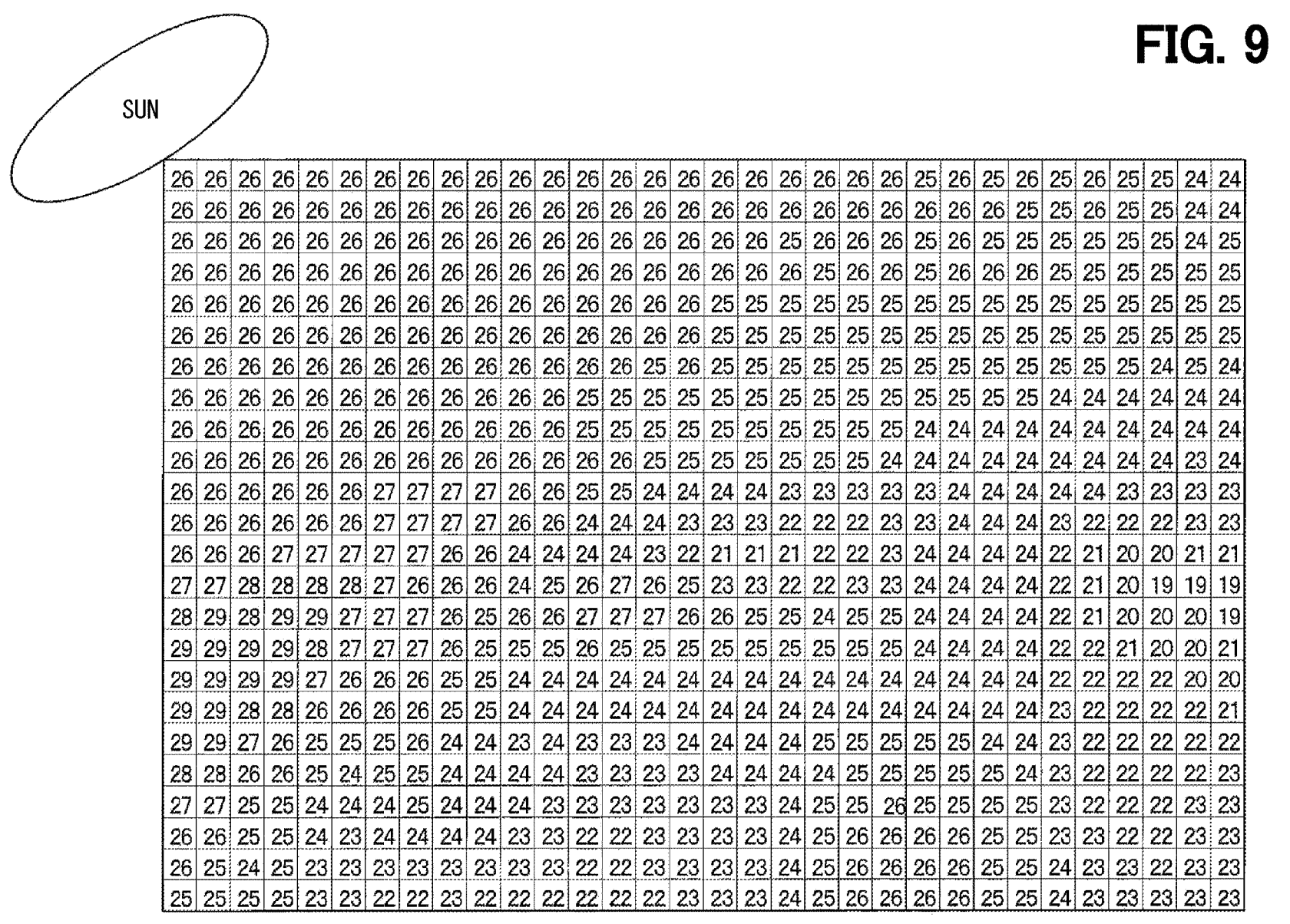
Figure 10:
FIG. 10 is a diagram showing the values of pixel of thermography in terms of density.

In fact, as shown in FIGS. 7, 8, 9, and 10, when the position of the sun with respect to the vehicle 2 changes, the temperature distribution in the cabin changes significantly. FIGS. 7 and 9 show the position of the sun and the luminance value of each pixel of the thermography. In the thermography, the upper side corresponds to the rear side of the vehicle and the lower side corresponds to the front side of the vehicle. FIG. 8 shows the luminance value represented by the density in the same thermography as in FIG. 7. FIG. 10 shows the luminance value represented by the density in the same thermography as in FIG. 9. The higher the density, the higher the luminance value.

As shown in FIGS. 7 and 8, when the sunlight is incident from directly above the vehicle 2, the temperature of a portion corresponding to the ceiling becomes extremely high, and the difference in temperature distributions between the left and right in the cabin is small. Further, as shown in FIGS. 9 and 10, when the sunlight is incident into the cabin from the rear side of the driver seat of the vehicle 2, the temperatures of the driver side glass 33 and the rear glass 35 become high. At the same time, the closer to the sun, the higher the temperature in the cabin. In step 110, the air conditioner ECU 40 can acquire information on the direction of solar radiation by acquiring the latest thermography from the infrared camera 21. In this way, the thermography contains information of solar radiation.

Figure 11:
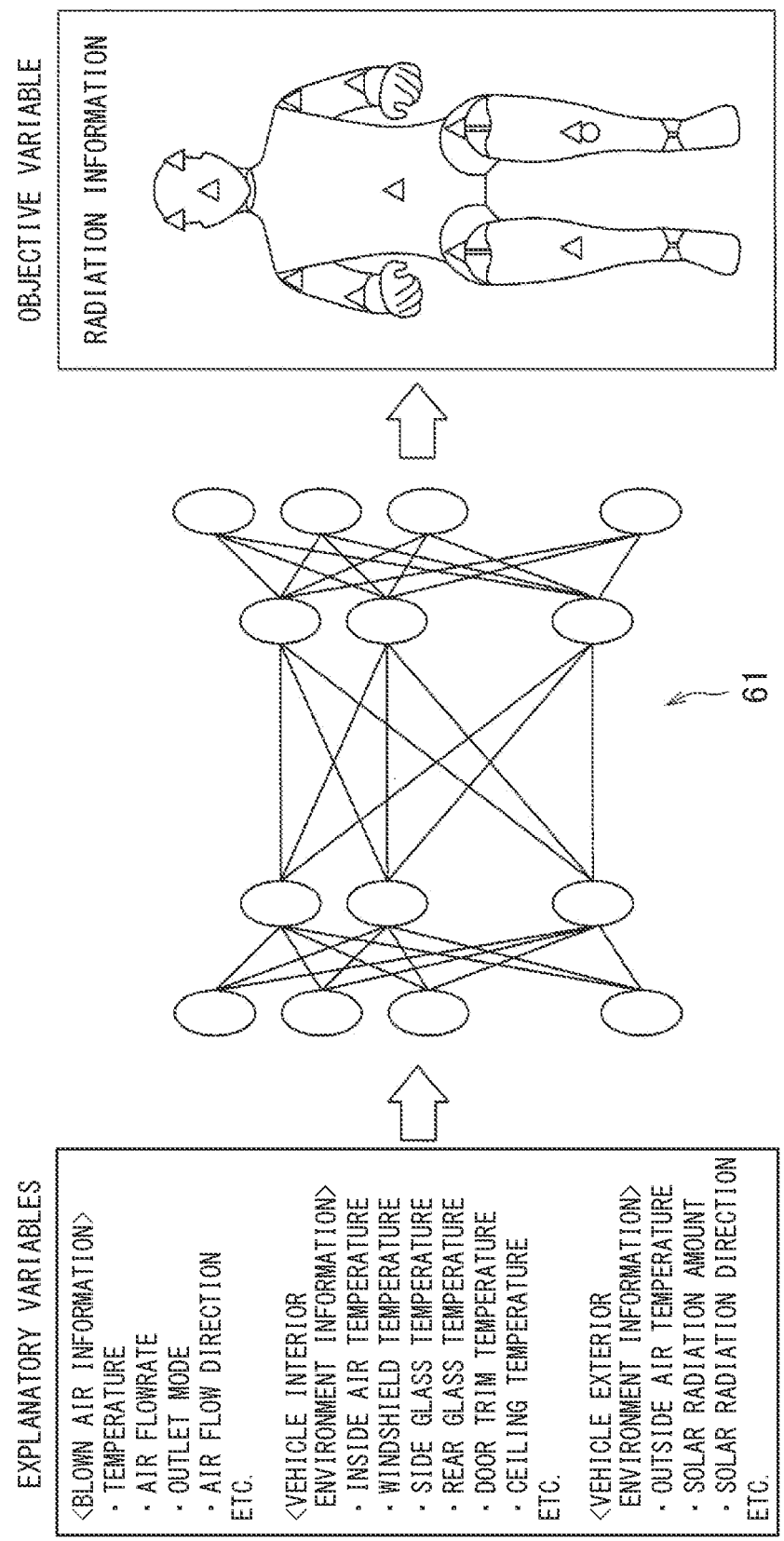
FIG. 11 is a diagram showing an outline of a process for calculating radiation information.
Figure 12:
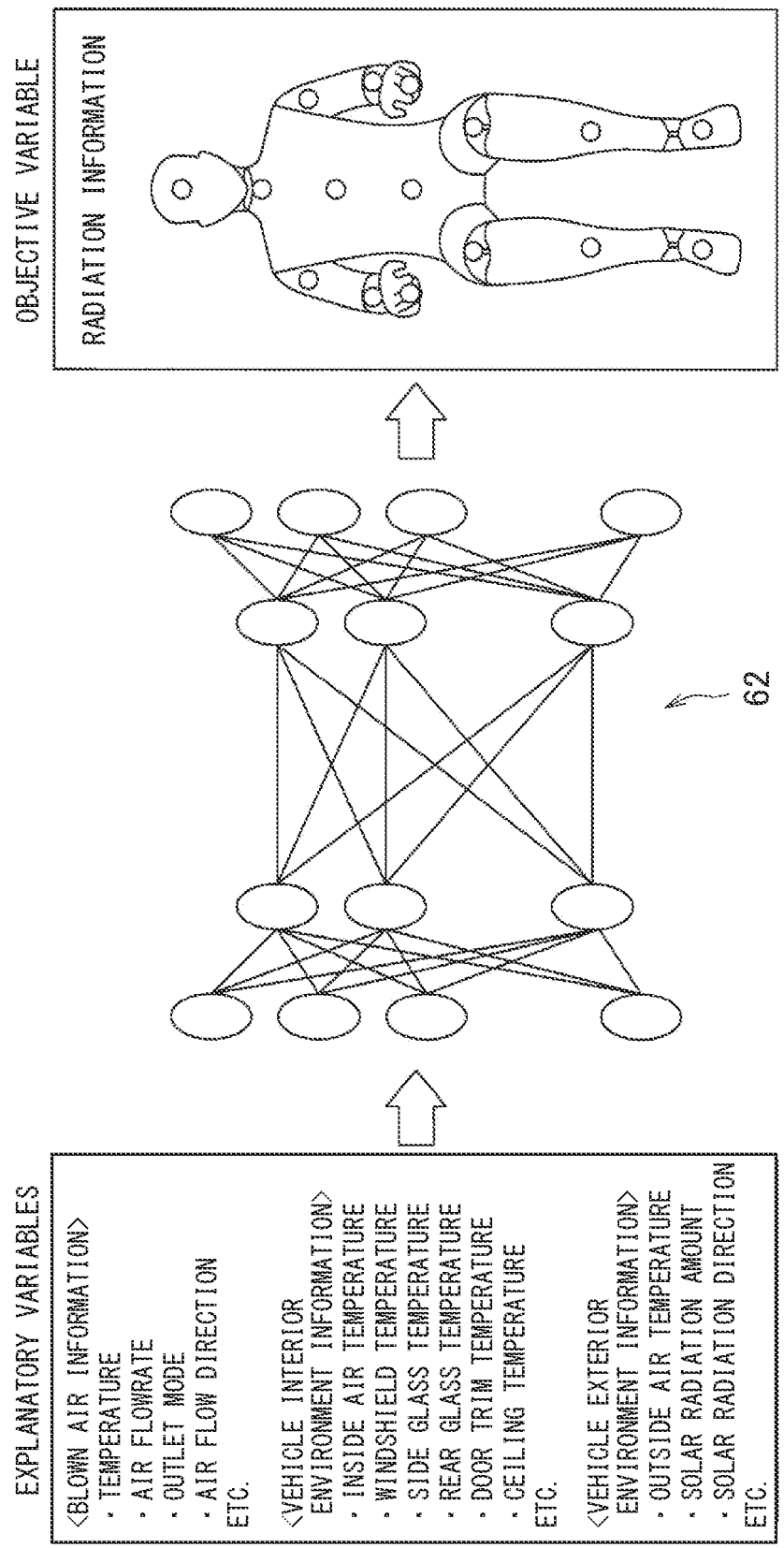
FIG. 12 is a diagram showing an outline of a process for calculating air temperature information.

Following step 110, the air conditioner ECU 40 calculates radiation information of the body parts of the occupant 6 in step 120. Specifically, as shown in FIG. 11, all of the blown air information, the vehicle interior environment information, and the vehicle exterior environment information acquired in the immediately preceding step 110 are input to the trained model 61 for the radiation information as explanatory variables. A value output from the trained model 61 as objective variable is acquired by the air conditioner ECU 40 as the radiation information of the twelve body parts. Each radiation information of the body parts output by the trained model 61 is the amount of radiation received by the body part. The amount of radiation output may be, for example, irradiance [W/m²].

The trained model 61 will be described. The trained model 61 is a neural network pre-recorded in the ROM or flash memory of the air conditioner ECU 40. As the neural network, for example, a well-known neural network such as CNN (Convolution Neural Network), RNN (Recurrent Neural Network), or LSTM (Long short-term memory) may be adopted.

In the trained model 61, when the blown air information, the vehicle interior environment information, and the vehicle exterior environment information are input as explanatory variables, the amount of radiation received by each of the body parts of the occupant 6, in a state where the values of the explanatory variables are realized, as the radiation information. For this purpose, the trained model 61 is recorded in the ROM or flash memory of the air conditioner ECU 40 in a pre-trained state by supervised learning using the experimental results in the actual vehicle as teacher data.

The correlation between a part of the explanatory variables and the radiation information will be described. The windshield temperature is a factor that increases the radiation around the occupant 6, mainly to the upper body. The side glass temperature is a factor that changes the radiation to the left or right side of the occupant. The rear glass temperature is a factor that changes the radiation to the rear of the occupant. The ceiling temperature is a factor that alters the radiation primarily from the head to the chest of the occupant. The outside air temperature is a factor that affects the windshield temperature, the side glass temperature, and the ceiling temperature, rather than a direct factor, and therefore has a strong correlation with radiation. The amount of solar radiation is a factor that increases the radiation to the upper body of the occupant. The direction of solar radiation is information that can be used in combination with the amount of solar radiation. Specifically, the correlation between the direction of solar radiation and the radiation strongly depends on the direction of solar radiation. Therefore, these amounts are appropriate as explanatory variables when calculating the amount of radiation received by the body parts of the occupant 6 using the trained model 61.

Following step 120, the air conditioner ECU 40 calculates the air temperature information of the body parts of the occupant 6 in step 130. Specifically, as shown in FIG. 11, all of the blown air information, the vehicle interior environment information, and the vehicle exterior environment information acquired in the immediately preceding step 110 are input to the trained model 62 for the air temperature information as explanatory variables. As a result, a value output as the objective variable from the trained model 62 is acquired by the air conditioner ECU 40 as the air temperature information of the sixteen body parts. Each air temperature information of the body parts output by the trained model 62 is the temperature of the air in the vicinity of the body part.

The trained model 62 will be described. The trained model 62 is a neural network pre-recorded in the ROM or flash memory of the air conditioner ECU 40. As the neural network, for example, a well-known neural network such as CNN, RNN, or LSTM may be adopted.

When the blown air information, the vehicle interior environment information, and the vehicle exterior environment information are input as explanatory variables, the trained model 62 outputs the temperature of air in the vicinity of the body parts of the occupant 6 as air temperature information in a state where the values of the explanatory variables are realized. For this purpose, the trained model 62 is recorded in the ROM or flash memory of the air conditioner ECU 40 in a pre-trained state by supervised learning using the experimental results in the actual vehicle as teacher data.

The correlation between a part of the explanatory variables and the air temperature information will be described. The blown air temperature is a factor that makes up the temperature of air in the entire cabin, and has a strong correlation with the air temperature around the occupant 6 existing in the air. If the volume of the blown air is large, the air around the occupant 6 is moved. If the volume of the blown air is small, the air around the occupant 6 does not move. Therefore, the volume of the blown air has a strong correlation with the air temperature around the occupant 6.

In the face mode, the change in the air temperature around the upper body of the occupant 6 is large. In the foot mode, the change in the air temperature around the lower body of the occupant 6 is large. Therefore, the outlet mode has a strong correlation with the temperature of air in the vicinity of the occupant 6. When the air flow direction changes, the body part of the occupant 6 mainly receiving the blown air changes greatly. Therefore, the air flow direction has a strong correlation with the temperature of air in the vicinity of the occupant 6. The inside air temperature is a quantity that represents the temperature of the entire cabin, and can be considered as the base temperature of the entire air around the occupant 6. Therefore, the inside air temperature has a strong correlation with the temperature of air in the vicinity of the occupant 6.

The windshield temperature largely depends on the outside air temperature and the amount of solar radiation from the front side in the vehicle travelling direction. The windshield temperature is a factor that raises the air temperature around mainly the upper body of the occupant. The side glass temperature largely depends on the outside air temperature and the amount of solar radiation from the lateral direction due to the unbalanced solar radiation. The side glass temperature is a factor that changes the temperature of air left and right of the occupant 6. The rear glass temperature is a factor that changes the temperature of air behind the occupant. The ceiling temperature is a factor that mainly raises the temperature of air around the head-to-chest range of the occupant. The outside air temperature is a factor that influences the windshield temperature, the side glass temperature, and the ceiling temperature, rather than a direct factor. Therefore, the outside air temperature has a strong correlation with the air temperature around the occupant 6.

The amount of solar radiation is a factor that raises the temperature of air around the occupant, mainly, the upper body. The direction of solar radiation is information that can be used in combination with the amount of solar radiation. Specifically, the correlation between the direction of solar radiation and the temperature of the air around the occupant 6 strongly depends on the direction of solar radiation.

Therefore, these amounts are appropriate as explanatory variables when calculating the temperature of air in the vicinity of the body parts of the occupant 6 using the trained model 62.

In step 140 following step 130, the air conditioner ECU 40 outputs the radiation information of the body parts and the air temperature information of the human bodies calculated in the immediately preceding steps 120 and 130 to the RAM or flash memory. As a result, the radiation information of the body parts and the air temperature information of the human bodies are recorded in the RAM or the flash memory. The radiation information of the body parts and the air temperature information of the human bodies recorded in this way are used, for example, in determining the air flow direction in the air conditioning control process 40B, as described above.

A method of creating the trained models 61 and 62 will be described. The trained models 61 and 62 are created by another training model creation device other than the air conditioner ECU 40.

The creators of the trained models 61 and 62 create teacher data and record the teacher data in the training model creation device. The teacher data are the experimental results in an actual vehicle, as described above. A vehicle for the experiments is equipped with the infrared camera 21 and the sensors 22 to 28 shown in FIG. 3. Further, the vehicle includes a sensor capable of detecting the amount of radiation received by the body parts of the occupant seated in the driver seat, and a sensor capable of detecting the temperature of air in the vicinity of the body parts of the occupant.

Figure 13:
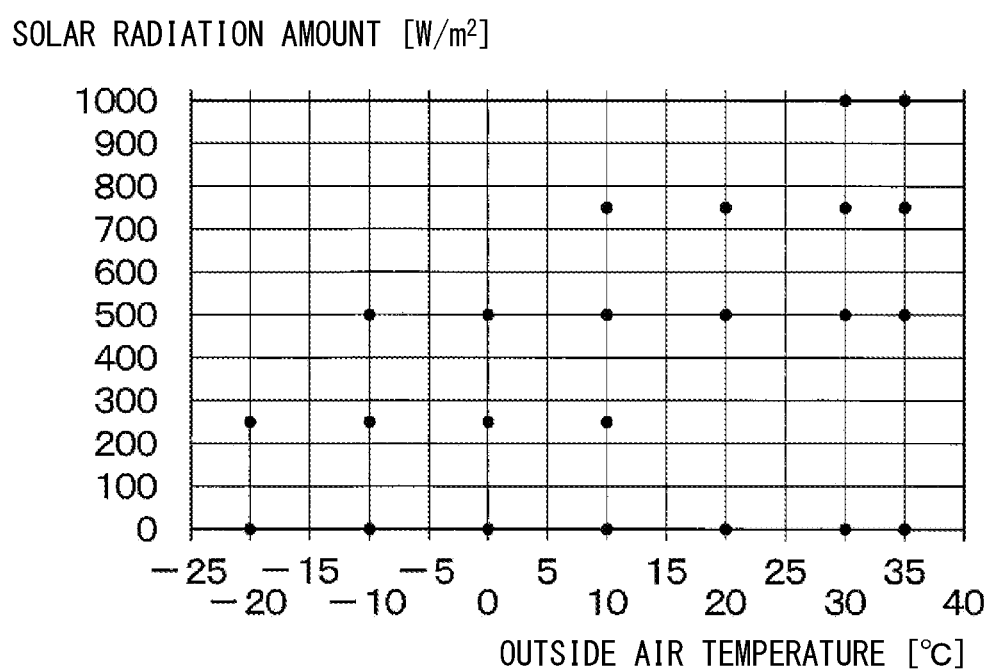
FIG. 13 is a graph showing an acquisition range of teacher data.

Then, for example, as shown by the black points in FIG. 13, experiments are conducted under 23 types experimental environments, such as middle of winter when the outside air temperature is −20° C. and the solar radiation amount is 0W/m$^2$, summer when the outside air temperature is 30° C. and the solar radiation amount is 1000 W/m$^2$, or middle period when the outside air temperature is 10° C. and the solar radiation amount is 500 W/m$^2$. Specifically, in each experimental environment, detection signals are acquired from the infrared camera and the sensors mounted on the vehicle for a predetermined time (for example, 1 hour), repeatedly (for example, periodically in a 1-second cycle). One set of teacher data is acquired at one timing of acquiring the detection signal.

The trained model creating device trains the trained models 61 and 62 by error back propagation method or the like using sets of teacher data obtained by such experiments. As a result of this learning, the weights of the neural networks corresponding to the trained models 61 and 62 are determined. At that time, when creating the trained model 61, the blown air information, the vehicle interior environment information, and the vehicle exterior environment information in the teacher data are used as explanatory variables, for each teacher data, and the radiation information in the teacher data is used as a correct answer data for the objective variable. Further, when creating the trained model 62, the blown air information, the vehicle interior environment information, and the vehicle exterior environment information in the teacher data are used as explanatory variables, for each teacher data, and the air temperature information in the teacher data is used as a correct answer data for the objective variable.

Figure 14:
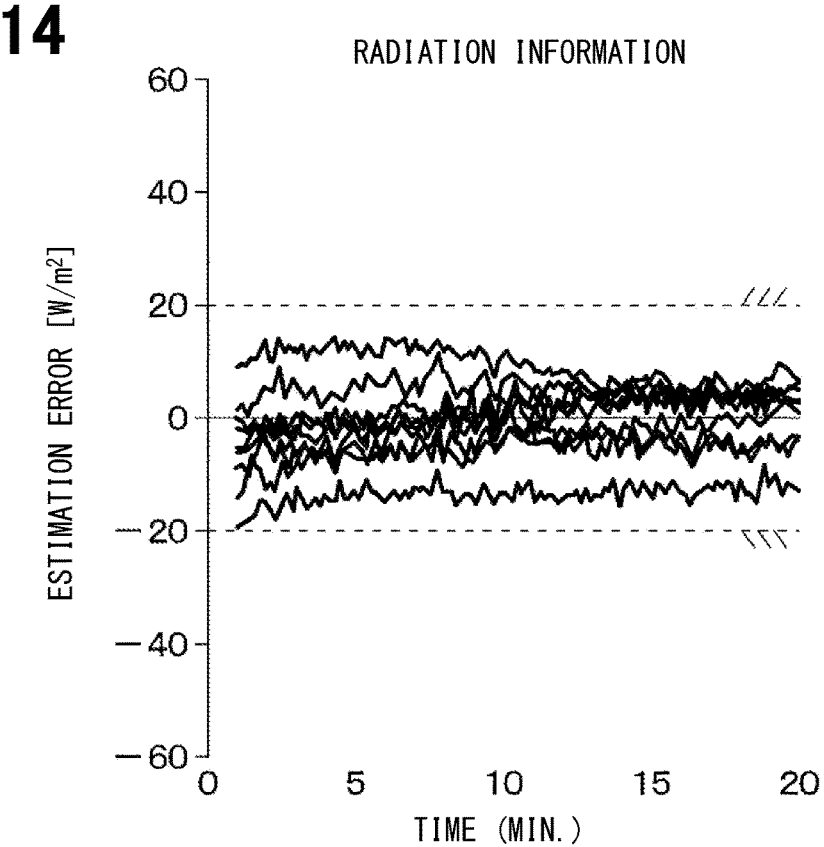
FIG. 14 is a graph of radiation information calculated by a trained model for radiation information under predetermined conditions.
Figure 15:
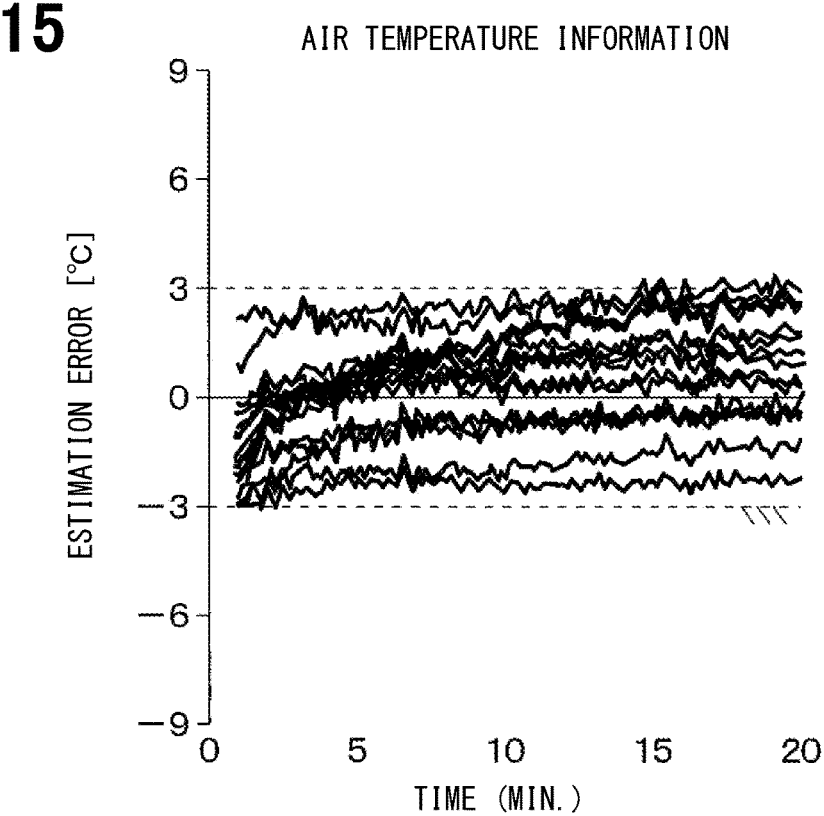
FIG. 15 is a graph of air temperature information calculated by a trained model for air temperature information under predetermined conditions.

FIG. 14 shows the radiation information calculated by the air conditioner ECU 40 using the trained model 61 for the radiation information under a predetermined condition. FIG. 15 shows the air temperature information calculated by the air conditioner ECU 40 using the trained model 62 for the air temperature information under the same predetermined condition. The predetermined condition is that the outlet mode is a bi-level mode, the outside air temperature is 30° C., the amount of solar radiation is 500 W/m$^2$, and the solar radiation comes from directly above the vehicle.

As shown in FIG. 14, the value calculated as the amount of radiation received by the whole twelve body parts of the occupant 6 is less than or equal to 20 W/m$^2$ over 20 minutes as the absolute value of the difference from the actual value. Further, as shown in FIG. 15, the value calculated as the temperature of air in the vicinity of the whole sixteen body parts of the occupant 6 is less than or equal to 3° C. for 20 minutes, as the absolute value of the difference from the actual value. As described above, in both the trained models 61 and 62, the error between the calculated value and the actual value, that is, the estimation error is sufficiently small.

As described above, the air conditioner ECU 40 calculates the radiation information of the body parts of the occupant 6 in the cabin and the air temperature information of the body parts of the occupant 6 based on the member temperature information. As mentioned above, the amounts of radiation received by the body parts of the occupant may be significantly different from each other. According to the inventors' examination, there are two reasons. One is that there are plural members exposed at different positions in the cabin and having different temperatures. The other is that the body parts differently receive the radiation from the plural members mainly.

Therefore, the plurality of radiation information is calculated based on the member temperature information that reflects the temperatures of the members exposed in the cabin of the vehicle. Thus, the plurality of radiation information can be calculated based on appropriate information in accordance with such circumstances peculiar to the cabin.

In addition, the temperatures in the vicinity of the body parts of the occupant 6 may differ greatly from each other. According to the inventors' examination, there are two reasons. One is that there are plural members exposed at different positions in the cabin and having different temperatures. The other is that the body parts receive thermal influence differently from the multiple members primarily.

Therefore, the plurality of air temperature information is calculated based on the member temperature information reflecting the temperatures of the members exposed in the cabin. Thus, the plurality of air temperature information can be calculated based on appropriate information according to the circumstances peculiar to the cabin.

Further, the thermography includes a pixel group representing each temperature distribution of the driver side door trim 31, the passenger side door trim 32, the driver side glass 33, the passenger side glass 34, the rear glass 35, and the ceiling 36. When the thermography includes a pixel group representing the temperature distribution of one or more members, the plurality of radiation information can be calculated by reflecting the temperature distribution of each member, unlike the case of acquiring the representative temperature of each member. Therefore, the calculation accuracy of the plurality of radiation information is improved. The infrared camera 21 capable of generating a thermography is suitable as a sensor for acquiring the temperature distribution of each member.

The thermography also contains information on the direction of solar radiation. Thus, it is possible to obtain information from the thermography, such as the direction of sunlight, which can be a major factor causing the non-uniformity of radiation into the cabin.

Further, the thermography includes a pixel group representing the temperature of the ceiling 36, a pixel group representing the temperature of the rear glass 35, a pixel group representing the temperature of the driver side glass 33, and a pixel group representing the temperature of the passenger side glass 34. Therefore, it is possible to obtain information reflecting the temperature of a large member surrounding the occupant from the thermography.

Further, the air conditioner ECU 40 calculates an objective variable including the plurality of radiation information and the plurality of air temperature information from the explanatory variables including the member temperature information by the trained models 61 and 62 of the neural network learned by supervised learning. When the plurality of radiation information and the plurality of air temperature information are calculated by using the thermography, the amount of information that is the basis of the calculation becomes enormous. In such a case, the development burden of the algorithm for the calculation is greatly reduced by using the trained model for the calculation.

Further, the air conditioner ECU 40 calculates the plurality of air temperature information based on the member temperature information and the blown air temperature. Since the blown air information, which is information about the air blown from the air conditioner 10 into the cabin, adjusts the temperature of air in the cabin in the first place, the blown air information strongly affects the temperature of air in the vicinity of the body parts of the occupant. Therefore, it is possible to calculate the plurality of air temperature information more accurately by using the blown air information as the basis for calculating the plurality of air temperature information.

In the present embodiment, the air conditioner ECU 40 corresponds to an acquisition unit by executing step 110 in FIG. 6, corresponds to a calculation unit by executing steps 120 and 130, and corresponds to an output unit by executing step 140.

OTHER EMBODIMENTS

The present disclosure is not limited to the embodiment, and can be appropriately modified. Further, in the above-described embodiment, the elements constituting the embodiment are not necessarily essential except when it is clearly stated that they are essential and when it is clearly considered to be essential in principle. The numerical value such as the number, the numerical value, the quantity, the range, or the like of a component mentioned in the above embodiment is not limited to a specific number unless specified as being required, clearly limited to such a specific number in principle, or the like. In particular, when a plurality of values are exemplified for a certain amount, it is possible to adopt a value between the plurality of values unless otherwise specified or when it is clearly impossible in principle. The shape, the positional relationship, and the like of a component or the like mentioned in the above embodiments are not limited to those being mentioned unless otherwise specified, limited to specific shape, positional relationship, and the like in principle, or the like. Further, in the above embodiment, when it is described that the vehicle external environment information (for example, humidity outside the vehicle) is acquired from the sensor, the sensor can be abolished and the vehicle external environment information may be received from the server or the cloud outside the vehicle. Alternatively, it is possible to abolish the sensor and acquire related information related to the external environmental information from a server or cloud outside the vehicle, and estimate the external environmental information from the acquired related information. The present disclosure also allows the following modifications and equal range modifications to the above embodiment. In addition, the following modifications can be independently selected to be applied or not applied to the above embodiment. That is, any combination of the following modifications except for clearly contradictory combinations can be applied to the above embodiment.

The control circuit and method described in the present disclosure may be implemented by a special purpose computer which is configured with a memory and a processor programmed to execute one or more particular functions embodied in computer programs of the memory. Alternatively, the control circuit described in the present disclosure and the method thereof may be realized by a dedicated computer configured as a processor with one or more dedicated hardware logic circuits. Alternatively, the control circuit and method described in the present disclosure may be realized by one or more dedicated computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

First Modification

In the embodiment, only the occupant 6 in the driver seat is the target for calculating the radiation information of the body parts and the air temperature information of the body parts. However, a passenger in a passenger seat next to the driver seat or an occupant in the rear seat 4 may be included as a target for calculating the radiation information of the body parts and the air temperature information of the body parts. The target for calculating the radiation information of the body parts and the air temperature information of the body parts may be only an occupant on a seat of the vehicle 2 other than the driver seat.

Second Modification

In the embodiment, the thermography includes information other than the rear glass temperature, among the member temperature information reflecting the temperatures of the members 31 to 36 exposed in the cabin. However, the thermography may include temperature information of the rear glass. For example, if the shooting range of the infrared camera 21 includes the windshield, this is realized. The position of the infrared camera 21 capable of realizing such a shooting range is the central portion of the ceiling in the front-rear direction in the cabin.

Third Modification

In the embodiment, the thermography is included as an explanatory variable input to the trained models 61 and 62. However, the explanatory variables input to the trained models 61 and 62 do not have to include the thermography. In that case, in order to include the side glass temperature, the rear glass temperature, the door trim temperature, and the ceiling temperature in the explanatory variables input to the trained models 61 and 62, the temperature based on the detection signal output from the sensor of the corresponding member can be set as explanatory variable. Specifically, the sensor of the corresponding member may be a temperature sensor that detects the temperature of the driver side door trim 31, the passenger side door trim 32, the driver side glass 33, the passenger side glass 34, the rear glass 35, and the ceiling 36. Such a temperature sensor may be, for example, a thermocouple. In this case, in the trained models 61 and 62, the temperature based on the detection signal is used as the teacher data at the time of learning.

Fourth Modification

In the embodiment, the air conditioner ECU 40 can adjust the flow direction of air blown out from the face outlet 100 in the air conditioning control process 40B. However, the air conditioner ECU 40 may not be able to adjust the flow direction of air blown out from the face outlet 100. In that case, a predetermined default value is input as the air flow direction information during both learning and use of the trained models 61 and 62. This default value is a predetermined value that is most likely to be realized in a normal usage environment.

Fifth Modification

In the embodiment, the blown air temperature input to the trained models 61 and 62 is a temperature based on the detection signals of the face temperature sensor 25, the foot temperature sensor 26, and the defroster temperature sensor 27. However, the face temperature sensor 25, the foot temperature sensor 26, and the defroster temperature sensor 27 do not necessarily have to be provided in the air conditioner 10. When the air conditioner 10 does not include these sensors 25, 26, 27, the air conditioner ECU 40 may estimate the temperature of air blown from the face outlet 100, the foot outlet 101, and the defroster outlet 102. Then, those estimated values may be input to the trained models 61 and 62 as the blown air temperature.

Specifically, the air conditioner ECU 40 estimates the temperature of air at the outlet 100, 101, 102 which is open according to the current outlet mode among the outlets 100, 101, 102 based on the three latest values of the evaporator temperature, the air mix ratio, and the engine water temperature. The evaporator temperature is detected by a temperature sensor arranged immediately downstream of the evaporator 14. The engine water temperature is detected by a temperature sensor provided in the pipe for the engine water in the heater core 15.

Alternatively, when the air conditioner 10 does not have the sensors 25, 26, 27, the blown air temperature is replaced with the evaporator temperature, the air mix ratio, or the engine water temperature, among the explanatory variables input to the trained models 61 and 62.

Sixth Modification

The body parts for which the radiation information and the air temperature information are calculated are not limited to those described in the embodiment. The number of body parts may be greater or less than the number in the embodiment.

Seventh Modification

In the embodiment, the radiation information and the air temperature information calculated by the radiation/temperature calculation process 40A are used to determine the air flow direction in the air conditioning control process 40B. However, the radiation information and the air temperature information calculated by the radiation/temperature calculation process 40A may not be used in the air conditioning control process 40B, but may be simply recorded in the flash memory of the air conditioner ECU 40. Even in that case, it is useful for collecting information.

Eighth Modification

In the embodiment, the air conditioner ECU 40 outputs the radiation information of the body parts and the air temperature information of the human bodies to the RAM or flash memory in step 140 of FIG. 6. However, the radiation information of the body parts and the air temperature information of the human bodies may be output to a device other than the RAM and the flash memory, such as another device in the cabin or a server outside the vehicle 2.

Ninth Modification

In the embodiment, the air conditioner ECU 40 may calculate the radiation information and not calculate the air temperature information in the radiation/temperature calculation process 40A. Alternatively, the air conditioner ECU

40 may calculate the air temperature information and not calculate the radiation information in the radiation/temperature calculation process 40A.

Tenth Modification

In the embodiment, the radiation/temperature calculation process 40A is executed by the air conditioner ECU 40. However, the radiation/temperature calculation process 40A may be executed by a device other than the air conditioner ECU 40. For example, the radiation/temperature calculation process 40A may be executed by an in-vehicle device mounted on the vehicle 2 other than the air conditioner ECU 40. In that case, the in-vehicle device corresponds to the radiation information calculating device and the temperature information calculating device. Further, for example, the radiation/temperature calculation process 40A may be executed by a server outside the vehicle 2. In that case, the server corresponds to the radiation information calculating device and the temperature information calculating device.

Eleventh Modification

The instrument panel may be included in the shooting range in the thermography. In that case, the explanatory variables also include information on the temperature of the instrument panel.

OVERVIEW

According to the first aspect shown in a part or all of the embodiment, the radiation information calculating device calculates the plurality of radiation information representing the amount of radiation received by the body parts, corresponding to the body parts of the occupant in the cabin, based on the member temperature information.

Further, according to the second aspect, the acquisition unit acquires the thermography of the cabin generated by the infrared camera as an image including a part of the member temperature information. The thermography includes a group of pixels representing each temperature distribution of one or more members of the plurality of members.

When the thermography includes a pixel group representing each temperature distribution of the one or more members, the plurality of radiation information can be calculated by reflecting the temperature distribution of each member, unlike the case of acquiring the representative temperature of each member. Therefore, the calculation accuracy of the plurality of radiation information is improved. An infrared camera capable of generating thermography is suitable as a sensor for acquiring the temperature distribution of each member.

Further, according to the third aspect, the acquisition unit acquires the thermography of the cabin generated by the infrared camera, and the thermography includes information on the direction of solar radiation. Thus, it is possible to obtain information from the thermography, such as the direction of sunlight, which can be a major factor causing non-uniformity of radiation into the cabin.

Further, according to the fourth aspect, the acquisition unit acquires the thermography of the cabin generated by the infrared camera as an image including a part of the member temperature information. The thermography includes a group of pixels representing the temperature of the ceiling of the vehicle, a group of pixels representing the temperature of the rear glass of the vehicle, and a group of pixels representing the temperature of the side glass of the vehicle. Thus, it is possible to obtain information from the thermography that reflects the temperature of the large member surrounding the occupant, such as the rear glass, the side glass, and the ceiling.

Further, according to the fifth aspect, the calculation unit calculates the objective variable including the plurality of radiation information from the explanatory variables including the member temperature information, using the trained model of the neural network learned by supervised learning.

When the plurality of radiation information is calculated using the thermography, the amount of information that is the basis of the calculation becomes enormous. In such a case, the development burden of the algorithm for the calculation is greatly reduced by using the trained model for the calculation.

Further, according to the sixth aspect, the temperature information calculating device calculates the plurality of air temperature information representing the temperature of air in the vicinity of the corresponding body part, corresponding to the body parts of the occupant in the cabin, based on the member temperature information.

Further, according to the seventh aspect, the acquisition unit acquires the blown air information including one or more of the temperature, the volume, the flow direction of air blown into the cabin from the air conditioner mounted on the vehicle, and the position of the outlet. The calculation unit calculates the plurality of air temperature information based on the member temperature information and the blown air information acquired by the acquisition unit.

Since the blown air information, which is information about the air blown from the air conditioner into the cabin, is used for adjusting the temperature of air in the cabin in the first place, the blown air information strongly affects the temperature of air in the vicinity of the body parts of the occupant. Therefore, it is possible to calculate the plurality of air temperature information more accurately by using the blown air information as the basis for calculating the plurality of air temperature information.

What is claimed is:

1. A radiation information calculating device comprising:
a processor and memory configured to
acquire member temperature information that reflects temperature of a plurality of members exposed to a cabin of a vehicle;
calculate a plurality of radiation information corresponding to each of body parts of an occupant in the cabin based on the member temperature information acquired by the processor, the radiation information representing an amount of radiation received by a corresponding body part of the occupant; and
output the plurality of radiation information calculated by the processor, wherein
the processor acquires a thermography inside the cabin captured by an infrared camera as an image including a part of the member temperature information,
the thermography includes a group of pixels representing each temperature distribution of at least one of the plurality of members,
the processor calculates an objective variable and the plurality of radiation information from an explanatory variable including the member temperature information by a trained model of a neural network learned by a supervised learning, and
the thermography includes information of solar radiation direction,
the processor and memory further configured to calculate a plurality of air temperature information corresponding to each of body parts of the occupant in the cabin based on the member temperature information acquired by the processor, the air temperature information representing temperature of air in a vicinity of a corresponding body part of the occupant; and output the plurality of air temperature information calculated by the processor, wherein the processor acquires information of air blown into the cabin from an air conditioner mounted on the vehicle, the information including at least one of temperature, volume, outlet position, and flow direction of the air blown into the cabin from the air conditioner, and the processor calculates the plurality of air temperature information based on the member temperature information and the information of air acquired by the processor.

2. The radiation information calculating device according to claim 1, wherein the thermography includes a group of pixels representing temperature of a ceiling of the cabin of the vehicle, a group of pixels representing temperature of a rear glass of the vehicle, and a group of pixels representing temperature of a side glass of the vehicle.

3. A radiation information calculating device comprising:

a processor and memory configured to acquire member temperature information that reflects temperature of a plurality of members exposed to a cabin of a vehicle;

calculate a plurality of radiation information corresponding to each of body parts of an occupant in the cabin based on the member temperature information acquired by the processor, the radiation information representing an amount of radiation received by a corresponding body part of the occupant; and output the plurality of radiation information calculated by the processor, wherein the processor acquires a thermography inside the cabin captured by an infrared camera as an image including a part of the member temperature information, the thermography includes a group of pixels representing each temperature distribution of at least one of the plurality of members, the processor calculates an objective variable and the plurality of radiation information from an explanatory variable the member temperature information by a trained model of a neural network learned by a supervised learning, and the thermography includes a group of pixels representing temperature of a ceiling of the cabin of the vehicle, a group of pixels representing temperature of a rear glass of the vehicle, and a group of pixels representing temperature of a side glass of the vehicle, the processor and memory further configured to calculate a plurality of air temperature information corresponding to each of body parts of the occupant in the cabin based on the member temperature information acquired by the processor, the air temperature information representing temperature of air in a vicinity of a corresponding body part of the occupant; and output the plurality of air temperature information calculated by the processor, wherein the processor acquires information of air blown into the cabin from an air conditioner mounted on the vehicle, the information including at least one of temperature, volume, outlet position, and flow direction of the air blown into the cabin from the air conditioner, and the processor calculates the plurality of air temperature information based on the member temperature information and the information of air acquired by the processor.

4. A temperature information calculating device comprising:

a processor and memory configured to acquire member temperature information that reflects temperature of a plurality of members exposed to a cabin of a vehicle;

calculate a plurality of air temperature information corresponding to each of body parts of an occupant in the cabin based on the member temperature information acquired by the processor, the air temperature information representing temperature of air in a vicinity of a corresponding body part of the occupant; and output the plurality of air temperature information calculated by the processor, wherein the processor acquires information of air blown into the cabin from an air conditioner mounted on the vehicle, the information including at least one of temperature, volume, outlet position, and flow direction of the air blown into the cabin from the air conditioner, and the processor calculates the plurality of air temperature information based on the member temperature information and the information of air acquired by the processor, the processor and memory further configured to calculate a plurality of radiation information corresponding to each of body parts of the occupant in the cabin based on the member temperature information acquired by the processor, the radiation information representing an amount of radiation received by a corresponding body part of the occupant; and output the plurality of radiation information calculated by the processor, wherein the processor acquires a thermography inside the cabin captured by an infrared camera as an image including a part of the member temperature information, the thermography includes a group of pixels representing each temperature distribution of at least one of the plurality of members, and the processor calculates an objective variable and the plurality of radiation information from an explanatory variable including the member temperature information by a trained model of a neural network learned by a supervised learning.

* * * * *